(No Model.)
A. J. CHASE.
APPARATUS FOR DISTILLING WATER.
No. 392,498. Patented Nov. 6, 1888.
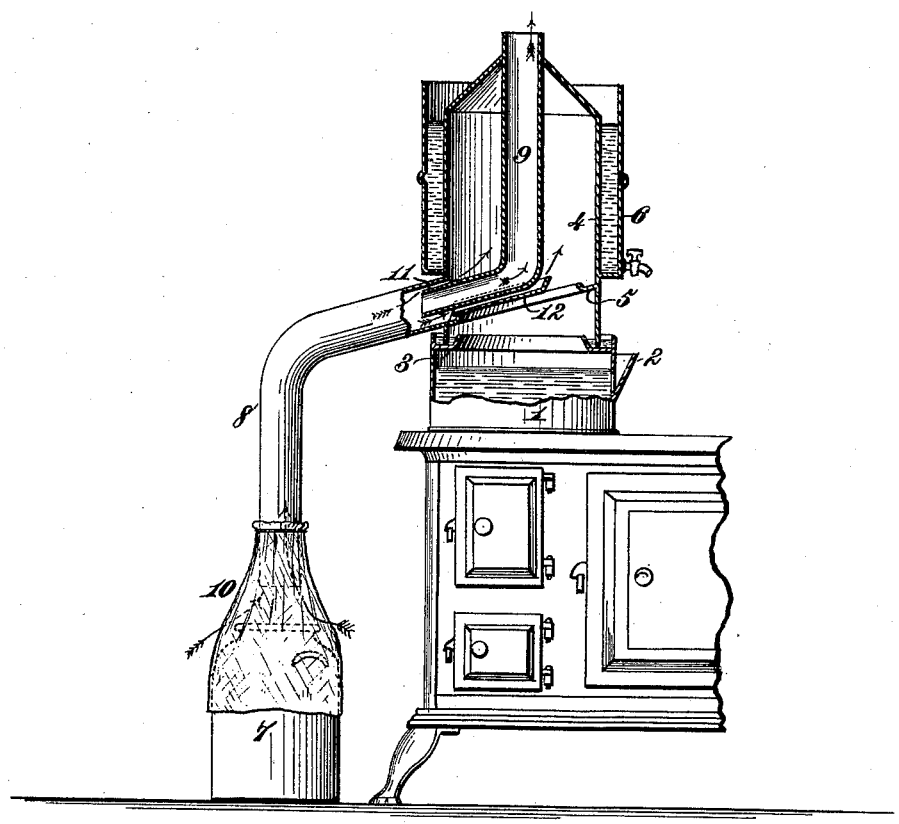
Witnesses.
Robt Everatt,
Geo. H. Rea.
Inventor.
Andrew J. Chase,
By
James L. Norris
Atty.

UNITED STATES PATENT OFFICE.

ANDREW J. CHASE, OF BOSTON, MASSACHUSETTS.

APPARATUS FOR DISTILLING WATER.

SPECIFICATION forming part of Letters Patent No. 392,498, dated November 6, 1888.

Application filed July 19, 1888. Serial No. 280,379. (No model.)

*To all whom it may concern:*

Be it known that I, ANDREW J. CHASE, a citizen of the United States, residing at Boston, in the county of Suffolk and State of Massachusetts, have invented new and useful Improvements in Apparatus for Distilling Water, of which the following is a specification.

This invention has for its object to provide a novel and efficient water-distilling apparatus which is simple in construction, and wherein the water which has lost its air by boiling is aerated after condensation and while passing to a collecting vessel or jar, thereby obtaining sweet and pure water ready for immediate use.

The invention consists in the combination of an evaporating-vessel, a vapor-condensing dome communicating therewith and provided with an internal inclined trough for receiving the water of condensation dropping down the inner surface of the dome, and an air-flue open at the top and bottom and extending through the dome laterally therefrom, and thence downward and communicating with the trough to receive the water of condensation therefrom and conduct it under exposure to an ascending cool-air current to a collecting vessel or jar.

The invention also consists in the combination of an evaporating-vessel, a vapor-condensing dome communicating therewith and provided on its inside with an inclined trough for receiving the water of condensation dropping down the inner surface of the dome, an air-flue open at the top and bottom and extending through the dome laterally therefrom, thence downward, and communicating with the trough to receive the water of condensation therefrom and conduct it under exposure to an ascending cool-air current to a collecting vessel or jar, and a fabric permeable to air secured around the bottom of the air-flue and adapted to overhang the mouth of the collecting vessel or jar for freeing the air from dust and like foreign matter in its passage to the flue.

The invention also consists in the combination of an evaporating-vessel, a vapor-dome in communication therewith and provided with an internal trough to receive the water of condensation dropping down the inner surface of the dome, and an air-flue composed of two sections, the lower section communicating with the trough to receive the water of condensation therefrom and convey it under exposure to an ascending cool-air current to a collecting vessel or jar, and the upper section rising through the dome and having its lower end extending into the upper end of the lower section, said sections having an air-space between the adjacent surfaces of their adjoining ends to admit air into the dome for avoiding the tendency of a vacuum therein.

The invention finally consists in the features of construction and combination of devices, all of which are hereinafter described and claimed, reference being made to the accompanying drawing, in which the figure is a sectional elevation of my improved domestic distilling apparatus, shown in connection with an ordinary kitchen-range or cook-stove.

In order to enable those skilled in the art to make and use my invention, I will now describe the same in detail, referring to the drawing, where—

The numeral 1 indicates an evaporating-vessel adapted to rest on a stove or other support, whereby it may be subjected to heat, said vessel containing the water to be vaporized, and having means—such as a funnel, 2—for supplying it with water as required while in use. The upper part of the evaporating-vessel is provided with a surrounding gutter, 3, adapted to hold water and form a water seal, in which is arranged the lower edge of a vapor-dome, 4, composed of a cylinder provided with a closed top wall, which is preferably conical to better suit the conditions required. The dome is shown as supported directly on the bottom wall of the gutter, and the water seal makes a closed joint at this point to prevent the entrance of external air and the exit of the vapor which rises from the boiling water. An inclined trough, 5, is secured to and extends entirely around the inside of the dome at a short distance above its lower edge, for the purpose of receiving the water of condensation which drops or flows down the inner surface of the dome. The vapor could be condensed by the colder walls of the dome without a water-jacket around the same to maintain it in a cold condition; but better results are obtained by placing a water-jacket, 6, about the dome, and therefore I prefer this construction.

In order to render the apparatus more efficient in use, increase its condensing-surface, and re-aerate the water-product, I provide a cold-air flue, open to the external atmosphere at its top and bottom, which subserves the purpose of conducting a column of cold air up through the center of the dome, to condense some of the vapor in the dome, to conduct all of the water of condensation to a collecting vessel or jar, 7, and to re-aerate the water after condensation and in its passage to such collecting vessel or jar. I have exhibited this flue in two sections, 8 and 9, each in the form of an elbow, the lower one, 8, secured at its upper end to the dome and at the point of attachment communicating with the internal trough, 5, while the lower end is provided with a surrounding fabric, 10, adapted to overhang the mouth of the collecting vessel or jar, for freeing the ascending air from dust and like impurities. The upper elbow-section, 9, rises through the center of the dome and has its lower end extended into the upper end of the lower section above the trough 5, and the parts are constructed in any suitable manner, so that there is a passage, 11, between the adjacent surfaces of the elbow-sections at their adjoining ends, whereby the vapor which is condensed on the cool surface of the upper elbow-section will flow down the same and drip into the lower elbow-section, which conducts it to the collecting vessel or jar. At the same time the passage 11 permits some of the ascending air to enter the dome, as indicated by the arrows, for the purpose of avoiding the tendency of a vacuum in the dome, which arises by the condensation of the vapor on the inner surface of the dome and outer surface of the upper section of the air-flue. In operation the air in the vertical portion of that part of the flue situate in the dome will become warm, and therefore rise and escape at the top of the flue, causing cooler air to flow into the lower end of the flue through the textile or other strainer-cloth, which strains off the dust and like floating impurities. The ascending air-currents act upon the descending drops of condensed water and re-aerate the same, which is very important, in that I thereby obtain a pure sweet water ready for immediate use.

The strainer cloth or fabric should be dampened at the commencement of the operation, after which it will remain moistened by reason of the vapor rising from the warm-water product. The heat rising from the evaporating-vessel serves to create a continuous circulation through the air-flue, the warm air escaping at the top and the cool air entering at the bottom and ascending and cooling the condensing-surfaces of the flue.

The vapor condenses rapidly upon the internal surface of the condensing-dome and the external surface of the air-flue. This tends to a vacuum, which is filled by air from the lower limb of the air-flue, entering through the air-passage between the adjacent ends of the flue-sections.

A drip-pan, 12, is located in an inclined position in the dome between the lower portion of the upper elbow and the trough to receive such water of condensation as may drip from the upper elbow in the dome and convey the same into the trough to pass off through the lower elbow.

Having thus described my invention, what I claim is—

1. The combination, in a water-distilling apparatus, of an evaporating-vessel, a condensing-dome in communication with the vessel and provided with a trough on its inner surface to receive the water of condensation, and an air-flue open at the top and bottom, extending upward, then laterally thereinto, and rising through said dome and communicating with the internal trough to receive the water of condensation therefrom and conduct it under exposure to an ascending air-current to a collecting vessel or jar, substantially as described.

2. The combination, in a water-distilling apparatus, of an evaporating-vessel, a condensing-dome communicating therewith and provided on its inner surface with a trough to receive the water of condensation, an air-flue open at the top and bottom, extending through the dome, then laterally therefrom and downward outside thereof, and communicating with the internal trough to receive the water of condensation therefrom and conduct it downward under exposure to an ascending air-current to a collecting vessel or jar, and a strainer-fabric permeable to air, secured around the lower end of the air-flue to overhang the mouth of the collecting vessel or jar, substantially as described.

3. The combination, in a water-distilling apparatus, of an evaporating-vessel, a condensing-dome in communication therewith and provided with an internal trough to receive the water of condensation, and an air-flue composed of two elbow-sections, the lower section communicating with the internal trough and extending downward outside the dome to conduct the water of condensation under exposure to an ascending air-current to a collecting vessel or jar, and the upper section extending into the lower section and rising through the dome, said sections having an air-passage between the adjacent surfaces of their adjoining ends, substantially as described.

4. The combination, in a water-distilling apparatus, of an evaporating-vessel, a condensing-dome in communication therewith and provided on its inner surface with an inclined trough, an air-flue extending upward, then laterally into the dome, and thence upward therethrough and in communication with the trough to receive the water of condensation therefrom, and a drip-pan located in the dome between the air-flue and the trough, substantially as described.

In testimony whereof I affix my signature in presence of two witnesses.

ANDREW J. CHASE.

Witnesses:
F. P. EWING,
EDWIN A. WADLEIGH.